(12) United States Patent
Kaihara et al.

(10) Patent No.: US 11,497,203 B2
(45) Date of Patent: Nov. 15, 2022

(54) SPILL-PROOF TACKLE BOX

(71) Applicant: Pure Fishing, Inc., Spirit Lake, IA (US)

(72) Inventors: Cameron Kaihara, Cayce, SC (US); Holly Hansen, Spirit Lake, IA (US)

(73) Assignee: Pure Fishing, Inc., Spirit Lake, IA (US)

( * ) Notice: Subject to any disclaimer, the term of this patent is extended or adjusted under 35 U.S.C. 154(b) by 833 days.

(21) Appl. No.: 16/130,984

(22) Filed: Sep. 13, 2018

(65) Prior Publication Data

US 2019/0075772 A1 Mar. 14, 2019

Related U.S. Application Data

(60) Provisional application No. 62/558,854, filed on Sep. 14, 2017.

(51) Int. Cl.
*A01K 97/06* (2006.01)
*B65D 1/36* (2006.01)

(52) U.S. Cl.
CPC .............. *A01K 97/06* (2013.01); *B65D 1/36* (2013.01)

(58) Field of Classification Search
CPC .... B65D 1/36; B65D 43/021; B65D 43/0206; B65D 43/0204; B65D 2543/00731; A01K 97/06
USPC ............... 206/315.11, 315.1, 6.1, 372–379; 220/790, 797, 794, 780; 312/201
See application file for complete search history.

(56) References Cited

U.S. PATENT DOCUMENTS

| 1,403,883 | A | * | 1/1922 | Woods | A47J 47/005 |
| | | | | | 269/13 |
| 3,948,579 | A | | 4/1976 | Schirmer | |
| 3,967,869 | A | * | 7/1976 | Jackson | A01K 97/06 |
| | | | | | 312/270.1 |
| 5,176,281 | A | | 1/1993 | Fiore | |
| 5,439,108 | A | | 8/1995 | Lackie | |
| 7,017,740 | B2 | * | 3/2006 | Itzkovitch | B25H 3/02 |
| | | | | | 206/372 |
| 2005/0155889 | A1 | * | 7/2005 | Lown | A01K 97/06 |
| | | | | | 206/501 |
| 2019/0055081 | A1 | * | 2/2019 | Guirguis | B65D 51/245 |

OTHER PUBLICATIONS http://www.planomolding.com/fishing/tackle-systems/youth-zombie-tackle-box, as early as Aug. 9, 2017.
http://www.planomolding.com/fishing/tackle-systems/ready-set-fish-one-tray-tackle-box, as early as Aug. 9, 2017.
(Continued)

*Primary Examiner* — Anthony D Stashick
*Assistant Examiner* — James M Van Buskirk
(74) *Attorney, Agent, or Firm* — Husch Blackwell LLP

(57) ABSTRACT

A fishing tackle box having removable tray. The box is designed to prevent the contents of the removable tray from becoming dislodged and mixed together if the box is dropped or tipped over while it is closed. In one embodiment, the tackle box comprises a base portion, a lid portion pivotally connected to the base portion, and a removable tray that includes a plurality of open compartments suitable for storing fishing items. A removable cover member rests on top of the removable tray, thereby covering each of the compartments and preventing their contents from becoming dislodged.

2 Claims, 3 Drawing Sheets

(56) References Cited

OTHER PUBLICATIONS https://www.flambeauoutdoors.com/adventurer-kids-tackle-box-w/-tackle.aspx, as early as Aug. 9, 2017.
https://www.flambeauoutdoors.com/Fishing/Hard-Storage/Classic-Tray-Boxes/3-tray-frost-blue, as early as Aug. 9, 2017.
https://www.flambeauoutdoors.com/Fishing/Hard-Storage/Classic-Tray-Boxes/1-tray, as early as Aug. 9, 2017.
http://www.planomolding.com/fishing/stowawayr-utility-boxes/waterproof/deep-waterproof-stowaway-3700,as early as Aug. 9, 2017.

* cited by examiner

SPILL-PROOF TACKLE BOX

CROSS-REFERENCE TO RELATED APPLICATIONS

This application claims the benefit of U.S. Provisional Application No. 62/558,854 entitled SPILL-PROOF TACKLE BOX, filed Sep. 14, 2017, which is hereby incorporated by reference in its entirety.

FIELD OF THE INVENTION

The present disclosure relates generally to fishing tackle boxes for holding fishing gear. In particular, the present disclosure relates to a fishing tackle box having removable tray, wherein the box is designed to prevent the contents of the tray from being dislodged and mixed up if the box is dropped or tipped over while it is securely closed.

BACKGROUND OF INVENTION

Fishing tackle boxes are useful for carrying fishing gear, including lures, hooks, tools, and other small items generally related to the sport of fishing. A wide variety of fishing tackle boxes are known in the art.

In order to be prepared for various fishing conditions and to attract and catch different varieties of fish, many fishermen carry a variety of different lures and hooks in their tackle boxes. Accordingly, most existing tackle box designs include a variety of distinct storage compartments that can be sued to separate and organize these items.

Unfortunately, in many existing tackle box designs, the contents of the various storage compartments can become dislodged and mixed together if the box is dropped, tipped over, or otherwise disturbed while in a securely closed position. This problem is particularly acute among tackle boxes used by children.

There is therefore a need in the art to provide a fishing tackle box that overcomes these disadvantages, and which may provide additional benefits and advantages as described in further detail below.

SUMMARY OF THE INVENTION

Disclosed herein is a fishing tackle box having removable tray. As described in further detail below, the box is designed to prevent the contents of the removable tray from becoming dislodged and mixed together if the box is dropped or tipped over while it is securely closed.

More particularly, in one embodiment, the tackle box comprises a base portion, a lid portion pivotally connected to the base portion, and a tray that may be selectively removable and may include a plurality of open compartments suitable for storing fishing items. The removable tray may also include a handle that can be used to easily remove it from the base portion of the tackle box.

In its storage position, the removable tray may rest on a lip protruding from the interior surface of the base portion of the tackle box. The tackle box further comprises a removable cover member that can be placed on top of the removable tray, thereby covering each of the compartments and preventing their contents from becoming dislodged.

When the lid portion is in the closed position, portions of its interior surface come into contact with the removable tray and the removable cover member, thereby holding both the removable tray and the removable cover member in place. The tackle box design provided herein thus prevents the contents of the removable tray from being dislodged if the box is dropped or tipped over while it is securely closed.

DESCRIPTION OF THE DRAWINGS

For a better understanding of the various embodiments of the present invention, reference may be made to the accompanying drawings in which.

Figure 1:
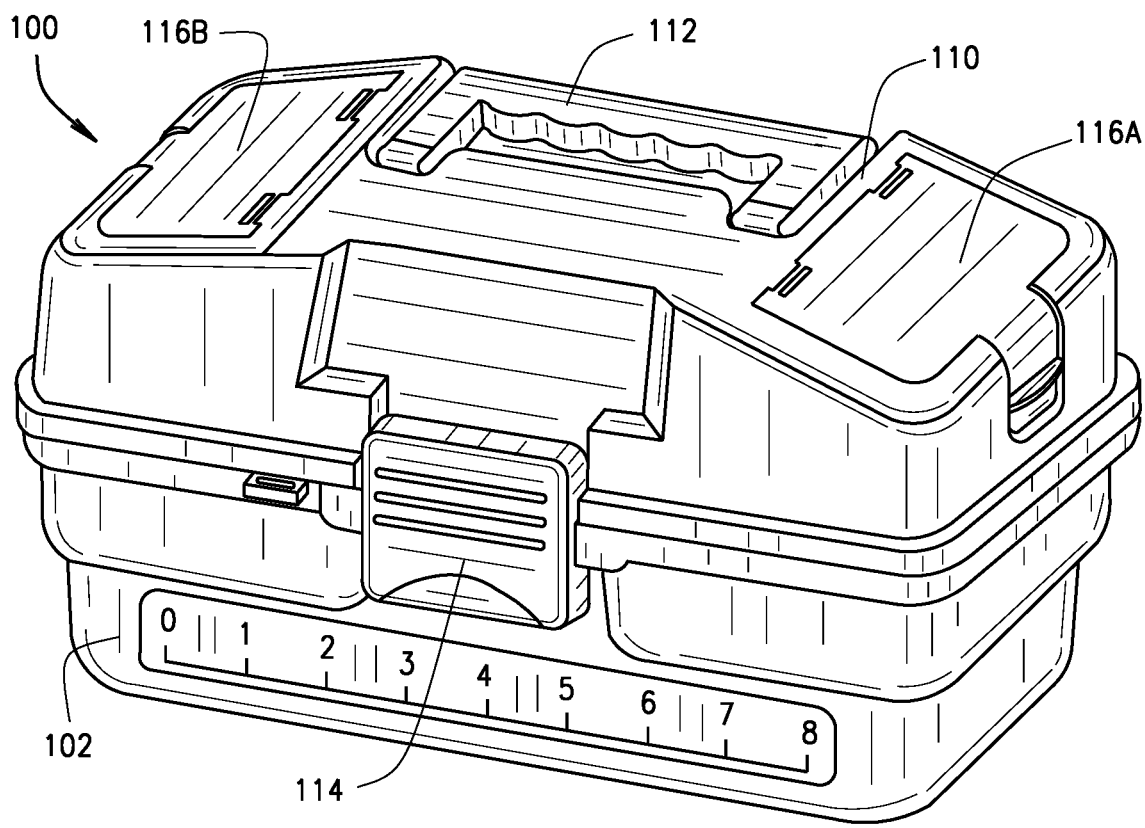
FIG. 1 is a front perspective view of an example embodiment of a fishing tackle box as provided herein, in which the lid portion has been rendered partially transparent for ease of viewing internal structures.

While the disclosure is susceptible to various modifications and alternative forms, a specific embodiment thereof is shown by way of example in the drawings and will herein be described in detail. It should be understood, however, that the drawings and detailed description presented herein are not intended to limit the disclosure to the particular embodiment disclosed, but to the contrary, the intention is to cover all modifications, equivalents, and alternatives falling within the spirit and scope of the present disclosure as defined by the appended claims.

DETAILED DESCRIPTION OF THE INVENTION

The invention will now be described with reference to the drawing figures, in which like reference numerals refer to like parts throughout. For purposes of clarity in illustrating the characteristics of the present invention, proportional relationships of the elements have not necessarily been maintained in the drawing figures.

Referring to the drawings, FIG. 1 depicts an exemplary embodiment of a fishing tackle box as described herein. The tackle box 100 comprises a base portion 102 having four walls and a bottom surface. A cover portion 110, shown in outline in FIG. 1, comprises four walls and an upper surface. Cover portion 110 is pivotally connected to the base portion 102, and is selectively moveable between an open position and a closed position as discussed in further detail below.

An optional handle 112 is pivotally connected to the cover portion 110, and provides a means of easily lifting and carrying the tackle box. Alternative embodiments may comprise, for example, a handle that is fixedly attached to the cover portion, or any other mechanism for lifting and carrying the tackle box as generally understood in the art. In the exemplary embodiment shown in FIG. 1, a latch 114 is operable to selectively secure the cover portion 110 to the base portion 102 and thereby hold the tackle box in a closed position. Other closure mechanisms may be used as generally understood in the art.

Figure 2:
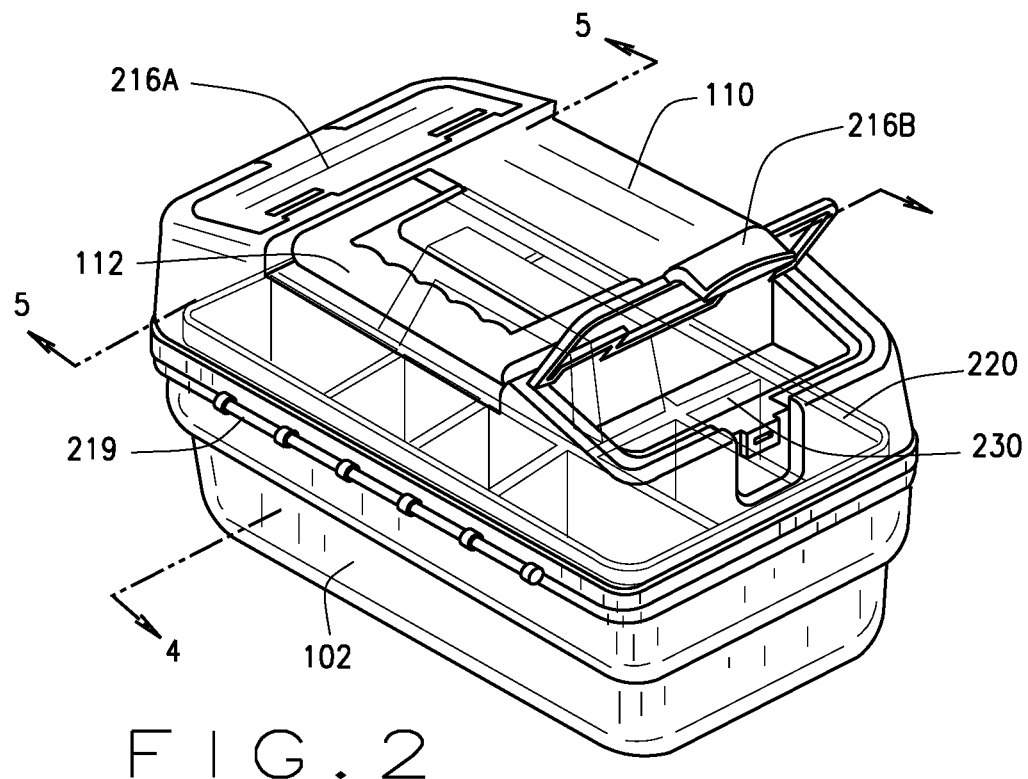
FIG. 2 is a rear perspective view of the example embodiment shown in FIG. 1.

In a preferred embodiment, as shown in FIG. 1, the tackle box optionally comprises compartments 116A and 116B that are accessible through openings in the top surface of cover portion 110. Advantageously, compartments 116A and 116B can be accessed when latch 114 is secured and cover portion 110 is in a closed position. In FIG. 2, cover portion 110 is depicted as partially transparent to reveal the interior features of the tackle box. As shown in FIG. 2, lid members 216A and 216B are each pivotally connected to cover portion 110, and can be selectively opened to provide access to compartments 116A and 116B, respectively.

Cover portion 110 is attached to base portion 102 at pivotal connection 219. The pivotal connection allows the cover portion to move selectively between a first position in which the container is open, and a second position in which the container is closed. The pivotal connection may be, for example, a hinge connection. Other pivotal connection mechanisms may be used as generally understood in the art.

Figure 3:
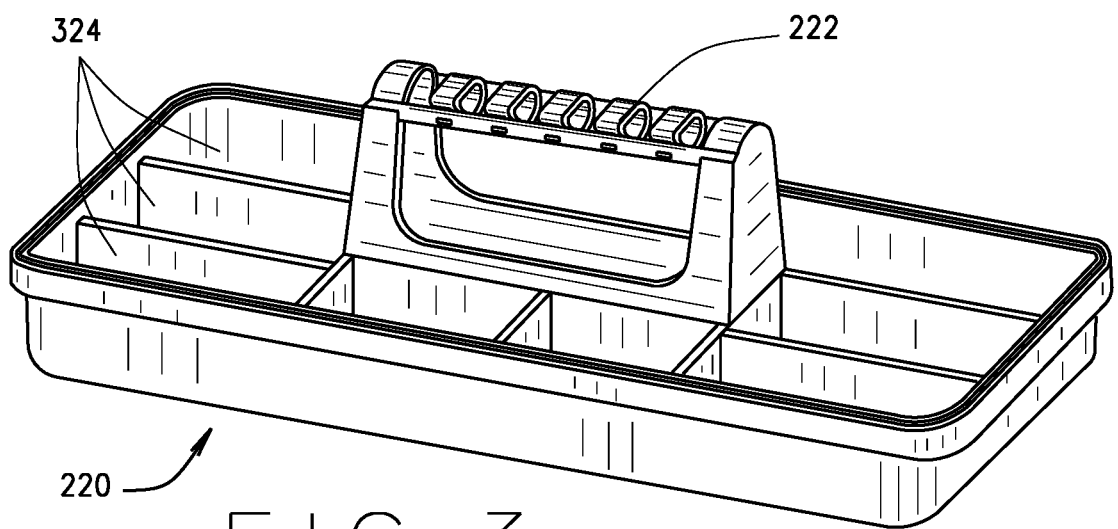
FIG. 3. is a close-up, perspective view of a removable tray as described herein.
Figure 4:
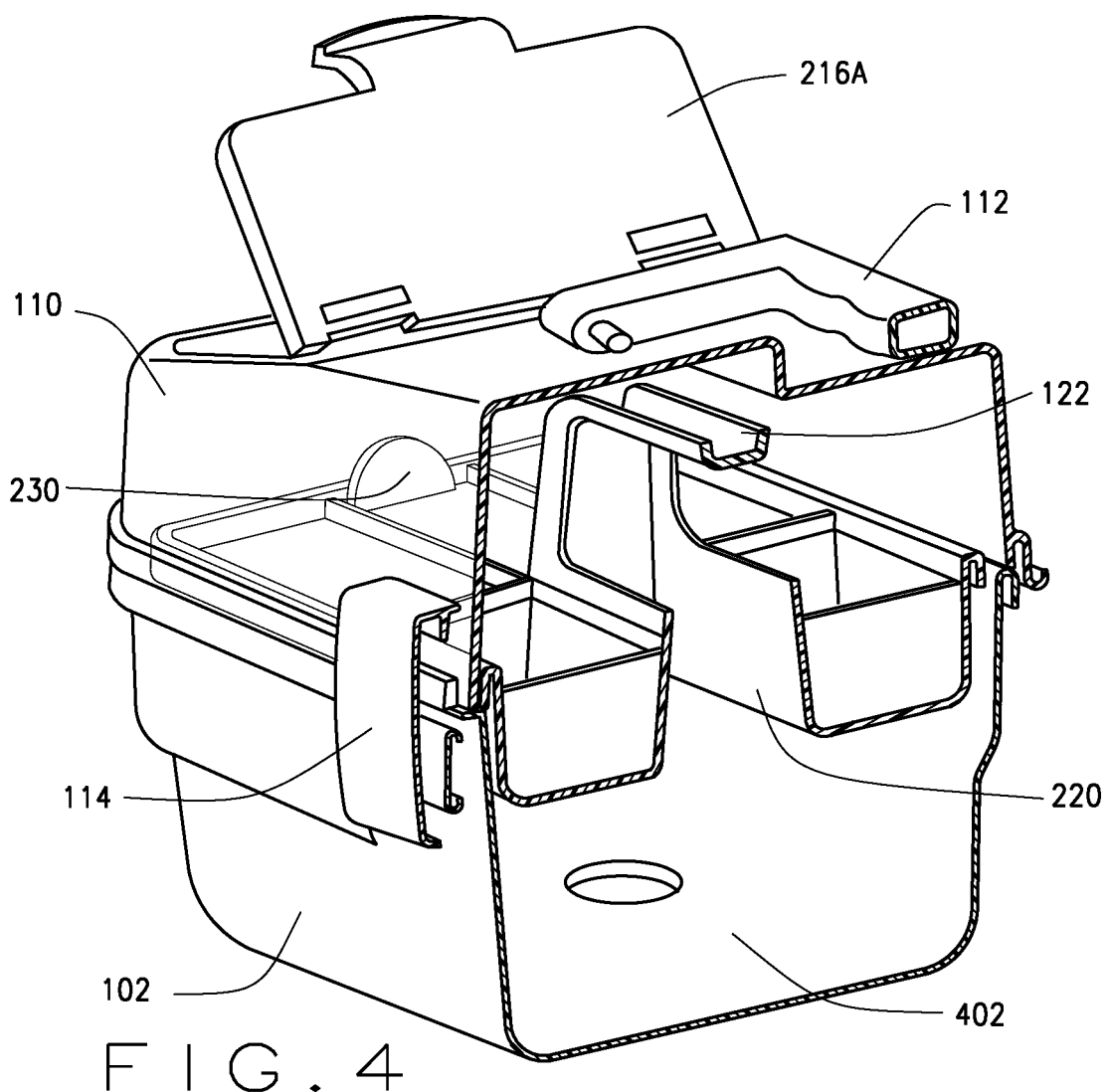
FIG. 4 is a cross-sectional, front perspective view of the example embodiment shown in FIG. 1, taken across the line 4-4 of FIG. 2.

A selectively removable tray 220 rests inside base member 102. A selectively removable cover member 230 rests on top of removable tray 220, and is sized and shaped to cover the removable tray. In the preferred embodiment shown in FIG. 3, removable tray 220 includes an optional handle 222. As shown in FIGS. 1 and 3, the handle may be ribbed, or may be generally "U" shaped in cross section as shown in FIGS. 2 and 4. Other handle shapes may also be used. Similarly, removable cover member 230 preferably includes an optional opening through which handle 222 can pass.

A close-up, perspective view of removable tray 220 is provided in FIG. 3. The removable tray 220 may comprise one or more open compartments 324 that are suitable for storing small items, including but not limited to fishing hooks and lures. The removable tray 220 preferably comprises a plurality of compartments 324. In preferred embodiments, the removable cover member is sized and shaped to form a lid over at least one of the open compartments 324. Most preferably, the removable cover member is sized and shaped to form a lid over all of the open compartments 324.

As shown in FIG. 4, the removable tray 220 rests above interior cavity 402 within the base member 102. The interior cavity 402 provides a larger storage space that can be used to store additional items, and can be accessed when removable tray 220 is selectively removed from the box.

Figure 5:
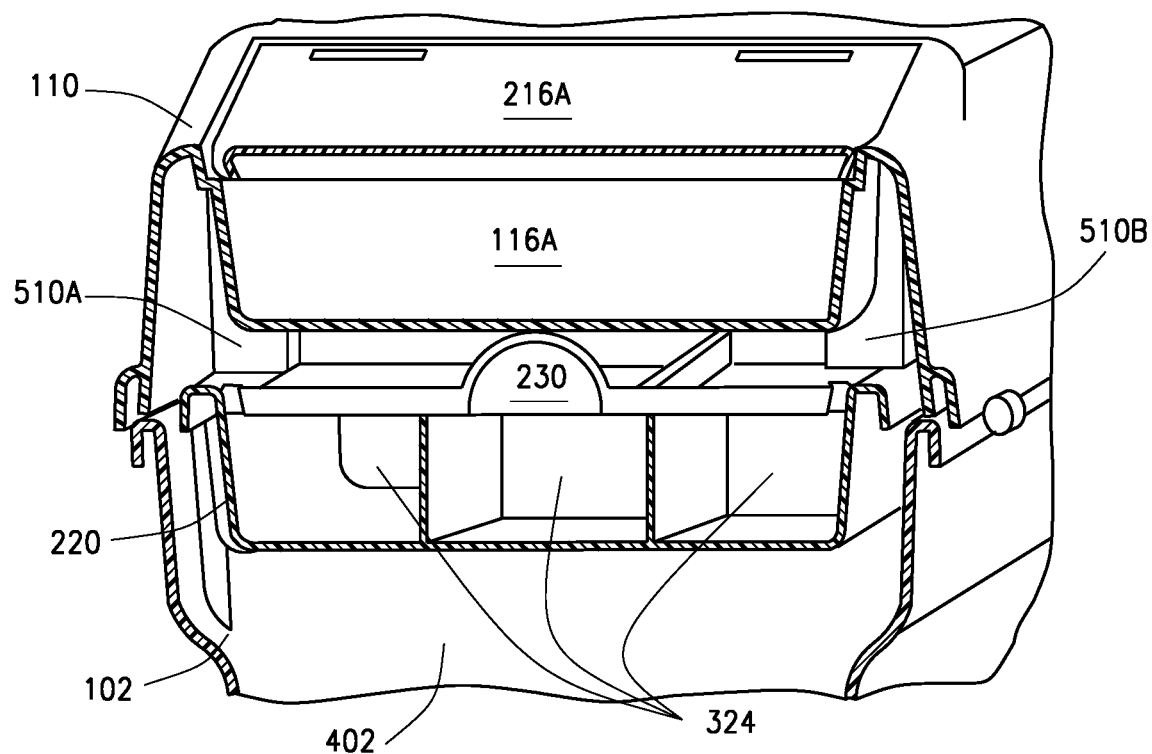
FIG. 5 is a cross-sectional, rear perspective view of the example embodiment shown in FIG. 1, taken across the line 5-5 of FIG. 2.

Cover member 110 may comprise a plurality of rib members 510 that protrude downward from its inner surface. For example, rib members 510A and 510B are shown in FIG. 5 as extending from the bottom exterior surface of compartments 116A and 116B. As noted above, compartments 116A and 116B themselves extend downwardly from the cover member 110. When cover member 110 is in a closed position, as shown in FIG. 5, the rib members come into contact with the removable cover member 230, which in turn is in contact with removable tray 220. The rib members 510A and 510B thus act to hold in place both the removable cover member 230 and the removable tray 220, preventing them from shifting or moving while the cover member is closed, and thus preventing the contents of the several compartments 324 from becoming dislodged and mixed together.

Figure 6:
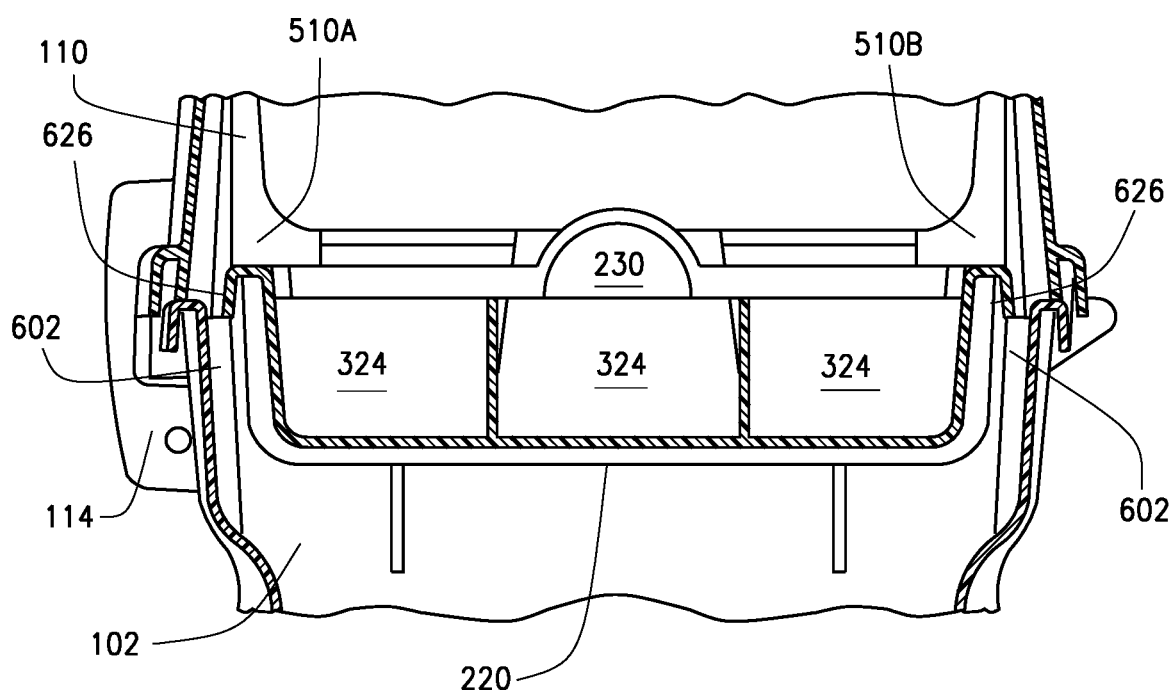
FIG. 6 is a cross-sectional, side elevation view of the example embodiment shown in FIG. 1, taken across the line 5-5 of FIG. 2.

As shown in FIG. 6, the removable tray 220 may comprise a horizontal lip portion 626 that extends outwards along its perimeter. Base portion 102 may comprise a horizontal surface 602 that extends inwardly from the interior surface of each of its four walls. As shown in FIG. 6, the lip portion 626 of removable tray 220 may rest on the horizontal surface 602 of base portion 102, thereby holding the removable tray 220 in place above the interior cavity 402 (shown in FIG. 5).

In a preferred embodiment, as shown in FIG. 6, the top surface of removable cover 230 is coplanar with the top surface of horizontal lip portion 626. Advantageously, in this embodiment, the rib members 510A and 510B provide even pressure on both the removable tray 220 (through its lip portion 626) and the removable cover 230 when the tackle box is in a closed position and secured with latch 114, thereby holding the removable cover and the removable tray 220 in fixed positions relative to one another and preventing the contents of the tackle box from becoming dislodged. However, it will be understood that the top surface of removable cover 230 may sit above or below the top surface of horizontal lip portion 626, so long as rib members 510 abut the removable cover 230 to hold it in place over the removable tray 220.

Alternative embodiments may utilize other structures for supporting the removable tray 220 in place above the interior cavity 402, as would be appreciated by those known in the art. As a non-limiting example, the removable tray 220 may be supported by one or more projections or rib members that extend upwardly from the bottom surface of interior cavity 402. It is also noted that removable tray 220 may not be removable, and may simply be a tray or other structure attached to or integrally formed with the base portion 102.

From the foregoing, it will be seen that the various embodiments of the present invention are well adapted to attain all the objectives and advantages hereinabove set forth together with still other advantages which are obvious and which are inherent to the present structures. It will be understood that certain features and sub-combinations of the present embodiments are of utility and may be employed without reference to other features and sub-combinations. Since many possible embodiments of the present invention may be made without departing from the spirit and scope of the present invention, it is also to be understood that all disclosures herein set forth or illustrated in the accompanying drawings are to be interpreted as illustrative only and not limiting. The various constructions described above and illustrated in the drawings are presented by way of example only and are not intended to limit the concepts, principles and scope of the present invention.

As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required."

Many changes, modifications, variations and other uses and applications of the present constructions will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A compartmentalized container comprising:
   a base portion having an interior surface and having an open top;
   a cover portion selectively engagable with the base portion, wherein the container is closed in a first position in which the cover portion is secured to the base portion;
   a selectively removable tray comprising at least one storage compartment, and having a selectively removable cover member that acts as a lid for the at least one storage compartment;

at least one rib member extending downwardly from an interior surface of the cover portion when the cover portion is secured to the base portion in the first position, wherein said at least one rib member abuts said removable tray in the first position to thereby hold said cover member in place on the removable tray in a fixed position as a lid therefor;

wherein the removable tray comprises a horizontal lip that rests on a horizontal surface within the base portion;

wherein the base portion comprises an interior storage cavity below the removable tray; and wherein the top surface of the horizontal lip is coplanar with the top surface of the removable cover member.

2. The compartmentalized container of claim 1 wherein when the cover portion is in a closed position, said rib members come into contact with both the top surface of the horizontal lip and the top surface of the removable cover member, thereby holding the removable cover member and the removable tray in fixed positions relative to one another and preventing the contents of said storage compartments from becoming dislodged.

* * * * *